US012611820B2

(12) United States Patent
Köhler et al.

(10) Patent No.: US 12,611,820 B2
(45) Date of Patent: Apr. 28, 2026

(54) METHOD FOR JOINING FIBER COMPOSITE PARTS BY ULTRASONIC WELDING

(71) Applicant: Airbus Operations GmbH, Hamburg (DE)

(72) Inventors: Filipp Köhler, Hamburg (DE); Moritz Reiners, Hamburg (DE); Holger Buettemeyer, Hamburg (DE); Guenther Thielemann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 96 days.

(21) Appl. No.: 17/849,958

(22) Filed: Jun. 27, 2022

(65) Prior Publication Data

US 2023/0001646 A1     Jan. 5, 2023

(30) Foreign Application Priority Data

Jun. 30, 2021     (EP) ..................................... 21182908

(51) Int. Cl.
| | |
|---|---|
| *B29C 64/00* | (2017.01) |
| *B29C 65/08* | (2006.01) |
| *B29C 65/48* | (2006.01) |
| B29K 79/00 | (2006.01) |
| B29K 105/00 | (2006.01) |
| B29K 105/12 | (2006.01) |
| B29L 31/30 | (2006.01) |

(52) U.S. Cl.
CPC .............. B29C 65/08 (2013.01); B29C 65/48 (2013.01); *B29K 2079/085* (2013.01); *B29K 2105/0097* (2013.01); *B29K 2105/122* (2013.01); *B29K 2995/0094* (2013.01); *B29L 2031/3082* (2013.01)

(58) Field of Classification Search
CPC ................................. B29C 65/08; B29C 65/48
See application file for complete search history.

(56) References Cited

U.S. PATENT DOCUMENTS 5,286,542 A * 2/1994 Susi ........................ B29C 65/08
428/57

FOREIGN PATENT DOCUMENTS

| DE | 102006027463 A1 | 1/2008 |
|---|---|---|
| EP | 3 603 940 A1 | 2/2020 |

OTHER PUBLICATIONS

Https://zenodo.org/record/3463124/files/ULTRASONIC%20WELDING%20OF%20CF%20-%20EPOXY%20TO%20CF%20-%20PEEK%20COMPOSITES.pdf (Year: 2018).*
Jongbloed Bram et al, "On differences and similarities between static and continuous ultrasonic welding of thermoplastic composites," Composites Part B, Elsevier, Amsterdam, NL, vol. 23, Oct. 8, 2020.

(Continued)

*Primary Examiner* — Nicholas Krasnow
(74) *Attorney, Agent, or Firm* — KDW Firm PLLC

(57) ABSTRACT

To improve a method for ultrasonic welding of parts for vehicles and/or aircraft, a method in which an energy director made of non-woven fiber material is arranged between a first fiber composite part and a second fiber composite part to be joined together. A sonotrode is used to join/weld the parts together by pressing on the parts. The energy director is compliant such that a uniform even contact is generated between the first and second fiber composite parts during the welding process.

13 Claims, 1 Drawing Sheet

(56) References Cited

OTHER PUBLICATIONS

European Search Report for Application No. 21182908 dated Nov. 18, 2021.

Palardy et al., "On the effect of flat energy directors thickness on heat generation during ultrasonic welding of thermoplastic composites," Composite Interfaces, vol. 24, No. 2: 203-214 (Jun. 2016) <doi:10.1080/09276440.2016.1199149 >.

European Intention to Grant in EP Application No. 21182908.0, dated Mar. 28, 2025, 16 pages.

* cited by examiner

METHOD FOR JOINING FIBER COMPOSITE PARTS BY ULTRASONIC WELDING

CROSS-REFERENCE TO RELATED APPLICATION

This application claims priority to EP Patent Application No. 21182908.0 filed Jun. 30, 2021, the entire disclosure of which is incorporated by reference herein.

TECHNICAL FIELD

The disclosure herein relates to a method for joining a first fiber composite part to a second fiber composite part.

BACKGROUND

DE 10 2006 027 463 A1 discloses a method for ultrasonic welding of filters, wherein an energy director is used in the welding process.

SUMMARY

It is an object of the disclosure herein to improve a method for ultrasonic welding of parts for vehicles and/or aircraft.

The disclosure herein provides a method for joining a first fiber composite part to a second fiber composite part, the method comprising:

a) arranging the first fiber composite part and the second fiber composite part so that they form a joint portion to be joined;

b) arranging within the joint portion and between the first fiber composite part and the second fiber composite part an energy director that is suitable for influencing propagation of acoustic energy; and c) arranging a sonotrode on the first fiber composite part and energizing the sonotrode such that acoustic energy is transferred to the joint portion and finally a joint between the first fiber composite part and the second fiber composite part is formed.

Preferably, the first fiber composite part is a fuselage part for an aircraft fuselage or a body part for a vehicle body. Preferably, the second fiber composite part is a fuselage part for an aircraft fuselage or a body part for a vehicle body.

Preferably, the first fiber composite part is a fuselage part for an aircraft fuselage or a body part for a vehicle body and the second fiber composite part is a stiffener part configured for stiffening the fuselage part or the body part when joined to the part. Preferably, the second fiber composite part is a fuselage part for an aircraft fuselage or a body part for a vehicle body and the first fiber composite part is a stiffener part configured for stiffening the fuselage part or the body part when joined to the part.

Preferably, the energy director includes a compliant fiber material. Preferably, the fiber material is a non-woven material. Preferably, the fiber material includes fibers having a maximum length of 10 mm.

Preferably, first fiber composite part and/or the second fiber composite part includes a matrix material, and the energy director is made of a different material as the matrix material. Preferably, the matrix material is selected from a group consisting of polyaryletherketone (PAEK), polyetheretherketone (PEEK), polyetherketoneketone (PEKK), polyphenylene sulfide (PPS), and polyamide (PA). Preferably, the energy director is made of a polyetherimide (PEI) material.

Preferably, step c) includes pressing of the sonotrode onto the first fiber composite part and/or the second fiber composite part.

Preferably, the joint portion extends in a longitudinal direction and step c) includes moving the sonotrode along the longitudinal direction such that a weld seam is formed as the joint. Preferably, the sonotrode is pressed onto the first fiber composite part and/or the second fiber composite part in a sliding manner for the duration the sonotrode is energized to form the weld seam.

Preferably, step b) includes adhesively fixing the energy director to the first fiber composite part and/or the second fiber composite part. Preferably, step a) includes arranging the first fiber composite part and the second fiber composite part such that they form a partial overlap as the joint portion.

Preferably, c) includes energizing the sonotrode until the first fiber composite part, the second fiber composite part and the energy director melt at least partially in such a way that subsequent to de-energizing or moving the sonotrode a joint is formed between the first fiber composite part and the second fiber composite part.

The disclosure herein relates to the field of polymeric materials, especially those made from thermoplastic polymer types, which preferably contain textile fiber as reinforcement enabling the design of highly eco-efficient structural components at low weight for many application cases such as in aerospace or automotive. The thermoplastic polymer enables an assembly of parts to larger structural units by welding due to its nature to melt when exposed to high temperatures and to solidify during the cool down afterwards. Different working principles of welding are known of which ultrasonic welding is the one to which the disclosure herein belongs to.

Ultrasonic welding of thermoplastic polymers is based on the principle that the kinetic energy of an acoustic wave (of ultrasonic frequency) propagating inside a part will partly dissipate as heat energy, when this wave is trespassing the interface into an adjacent part. The heat will melt quantities of thermoplastic polymer close to the interface leading to a welded joint of both parts after cool down.

Ultrasonic welding is an applied and established technique in many industries where mostly nonreinforced, at low or moderate temperature melting polymers are applied (up 250° C.), e.g. in packaging industry for the sealing of bags and blister packages, in automotive for assembly of interior structures and fixation of system brackets or in many consumer goods consisting of assemblies of injection molded plastic parts. However, ultrasonic welding of high performance fiber reinforced thermoplastic materials based on either PPS, PEI, PEEK or PEKK matrix for aerospace or other high technology applications is at a low maturity level. The ideas herein aim to improve that. Hence, ultrasonic welding of those materials has not reached a significant industrial level, yet, apart from the use of ultrasonic welding as a fast fixation aid applied within the stacking of thermoplastic carbon fiber tapes before they are further processed to consolidated laminates.

Control of the energy dissipating at the interface is key for mastering of the ultrasonic welding of fiber reinforced thermoplastic materials. Several investigations were launched, which target at optimization of the ultrasonic sonotrode (geometry, working frequency and amplitude) and processing key characteristics such as clamping pressure, geometry and processing time. However, a significant improvement of the quality of the weld was made after implementation of specific design features, so called energy directors, between the parts to be welded. Such energy directors are typically of pyramidal shape, single or multiple flat polymeric film which are placed between the parts.

The mentioned energy directors are mostly used in static ultrasonic welding where they show good performance in realizing a robust welding process that can achieve high quality welds. In continuous ultrasonic welding which is preferred for long weld seams, which can be found during the integration of stiffener elements, those energy directors can lead to quality issues and an unstable welding process. Their stiff nature can lead to non-uniform contact between the energy director and the adherends which influence the heat generation and transfer and can finally lead to hot spots and un-welded areas. Non-uniform contact can be a result of manufacturing tolerances of the adherends and the energy director.

Hence, for stiff energy directors during continuous ultrasonic welding more compliant energy directors are preferred. The thermoplastic non-woven material which is described in this disclosure herein disclosure can be seen as such compliant energy director. The nature of the non-woven material allows a compaction due to the applied welding pressure (through the sonotrode) and therefore lead to uniform contact between the energy director and the adherends. The non-woven material is made of the same material as the matrix of the adherends which is usually the case for ultrasonic welding and also preferred to avoid compatibility issues between different polymers. The advantages of the use of a compliant energy director is not limited to continuous ultrasonic welding but can also be beneficial for static ultrasonic welding as manufacturing tolerances can also occur here which can lead to non-uniform contact between energy director and adherends.

This disclosure herein disclosure describes the use of a polymer non-woven material as energy director during ultrasonic welding. The feasibility of the material as energy director was assessed in the frame of feasibility study which also involved the comparison to more usual polymer films. The initial assessment indicated that the polymer non-woven material is suitable and moreover is advantageous compared to the polymer film as less quality defects (polymer and fiber squeeze out at edges of adherends) were observed. Therefore, it contributes to a more robust and reliable welding process. Within the assessment a 180 g/m² PEI non-woven material was welded using also adherends with a PEI surface. Based on the experience with ultrasonic welding of other materials this approach is not limited to PEI material but can be transferred to any other high-performance thermoplastic material such as PEEK, PEKK, or PPS and even to widely used "low-performance" materials such as Polyamide (PA). Moreover, the aerial weight of the non-woven material is not limited to 180 g/m² but was chosen based on availability for the mentioned study.

The non-woven material is based on PEI fibers with a maximum length of ca. 10 mm that are randomly distributed to achieve isotropic properties within one layer. The fibers of the non-woven material are mechanically connected by needling but also other technique such as the melt-blow-technique or spinning are possible.

The particular advantage of the non-woven material compared to more commonly used polymer films or pyramidal protrusion is its compliance which leads to a very uniform contact between the energy director and the adherends. During the welding process the energy director melts primarily and conducts heat into the adherends. This finally leads to melting of the first layer(s) of the adherends. Due to the uniform contact this heat transfer is also very uniform and reduces so called hot spots and un-welded areas. Those two effects are common defects in the frame of ultrasonically welded joints.

The energy director is placed in the interface of the two adherends to be joint. To avoid movement during the welding process, the non-woven material is fixed to the lower adherend by adhesive tape. Afterwards the adherends are welded by ultrasonic vibrations and a static welding and consolidation force. The results are two adherends welded to each other. In this case, the adherends are welded in a so-called single overlap configuration and can be mechanically tested.

BRIEF DESCRIPTION OF THE DRAWINGS

Embodiments of the disclosure herein are described in more detail making reference to the accompanying drawings wherein.

DETAILED DESCRIPTION

Figures 1A, 1B, 1C, 1D:
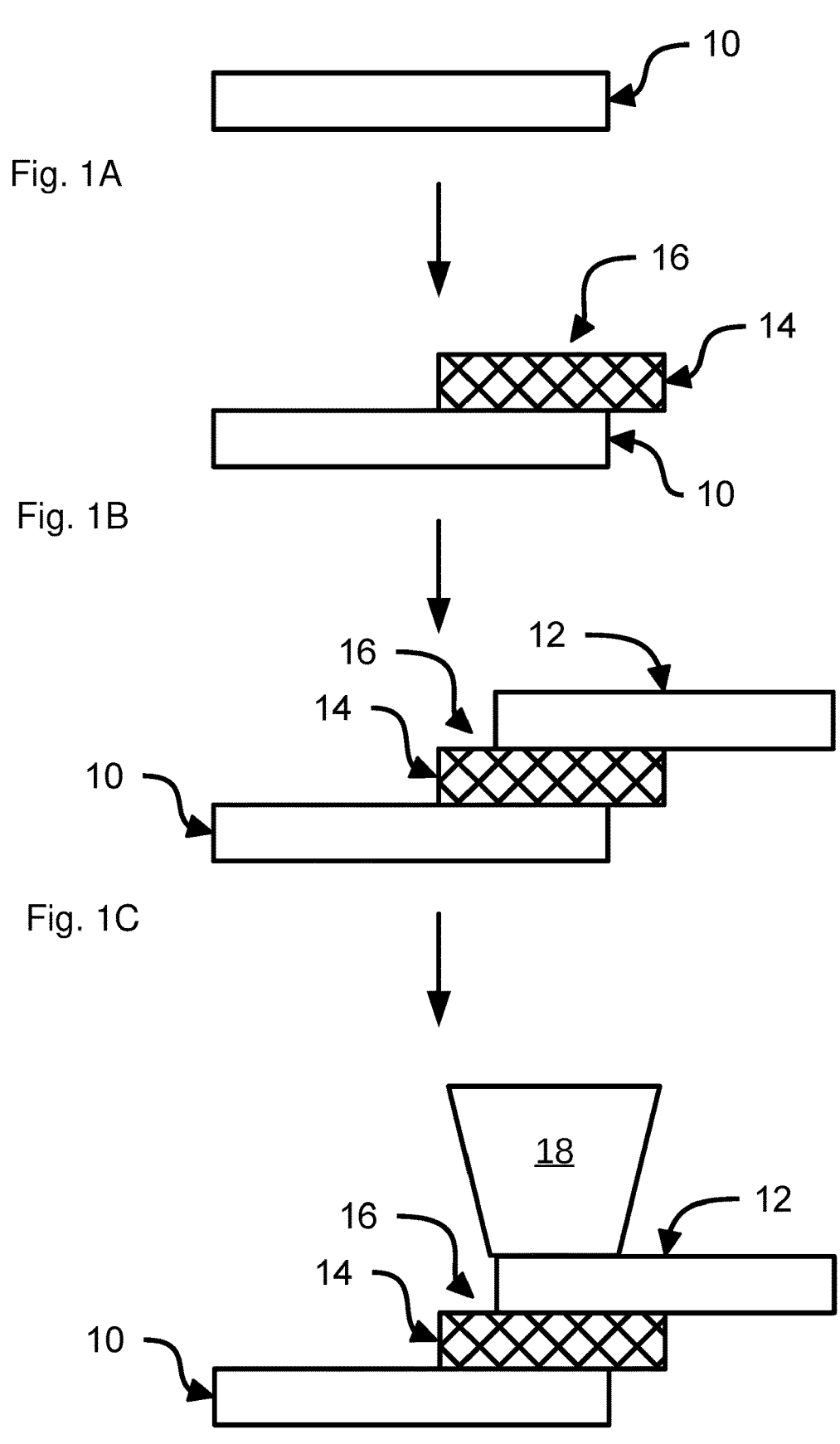
FIGS. 1A-1D depict an embodiment and a method for joining fiber composite parts.

Initially as depicted in FIG. 1A, a first fiber composite part 10 is provided that is to be joined to a second fiber composite part 12. The first fiber composite part 10 may be an aircraft fuselage part, such as a structural panel for an aircraft, and the second fiber composite part 12 may be a stiffener part for the structural panel. It is also possible that the first and second fiber composite parts 10, 12 are structural panels or skins for an aircraft to be joined together.

As shown in FIG. 1B, an energy director 14 is arranged on the first fiber composite part 10 at a joint portion 16. The energy director 14 is a piece of non-woven material that is preferably made from PEI or high performance polymer, such as any of the usual PAEKs.

As illustrated in FIG. 1C, the second fiber composite part 12 is arranged on the energy director 14 so as to overlap with the first fiber composite part 10 at the joint portion 16. The energy director 14 is a compliant member that is able to ensure a uniform even contact between the first and second fiber composite parts 10, 12, when pressed.

Subsequently as illustrated in FIG. 1D, a sonotrode 18 is pressed onto the second fiber composite part 12 and energized so as to melt a matrix material of the first and second fiber composite parts 10, 12 as well as the energy director 14. As a result, both the first and second fiber composite parts 10, 12 are fused together. The sonotrode 18 may be moved along the joint portion 16 (i.e. into or out of the drawing plane) in order to form a continuous weld seam. The sonotrode 18 may also be repeatedly energized and deenergized in order to form a series of weld points. It is also possible that the sonotrode 18 extends along the joint portion 16 in order to join the first and second fiber composite parts 10, 12 in one go.

It should be noted that, while the method was illustrated with reference to an arrangement of the first and second fiber composite parts 10, 12 being joined with their two large sides, other arrangements are possible. For example, both small sides may be joined together or a small and a large side.

In order to improve a method for ultrasonic welding of parts for vehicles and/or aircraft, the disclosure herein proposes a method in which an energy director (14) made of non-woven fiber material is arranged between a first fiber composite part (10) and a second fiber composite part (12)

to be joined together. A sonotrode (18) is used to join/weld the parts (10, 12) together by pressing on the parts (10, 12). The energy director (14) is compliant such that a uniform even contact is generated between the first and second fiber composite parts (10, 12) during the welding process.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 first fiber composite part
12 second fiber composite part
14 energy director
16 joint portion
18 sonotrode

The invention claimed is:

1. A method for joining a first fiber composite part to a second fiber composite part, the method comprising:
   a) arranging the first fiber composite part and the second fiber composite part to form a joint portion to be joined;
   b) arranging, within the joint portion and between the first fiber composite part and the second fiber composite part, an energy director that is suitable for influencing propagation of acoustic energy, wherein the energy director includes a compliant fiber material, and the fiber material is a non-woven material; and
   c) arranging a sonotrode on the first fiber composite part and energizing the sonotrode such that acoustic energy is transferred to the joint portion to form, at the joint portion, a joint between the first fiber composite part and the second fiber composite part.

2. The method according to claim 1, wherein the first fiber composite part and/or the second fiber composite part is a fuselage part for an aircraft fuselage or a body part for a vehicle body.

3. The method according to claim 1, wherein the first fiber composite part or the second fiber composite part is a fuselage part for an aircraft fuselage or a body part for a vehicle body and the second fiber composite part or the first fiber composite part is a stiffener part configured for stiffening the fuselage part or the body part when joined to the part.

4. The method according to claim 1, wherein step b) includes adhesively fixing the energy director to the first fiber composite part and/or the second fiber composite part.

5. The method according to claim 1, wherein; the fiber material is a non woven material
   the first fiber composite part and/or the second fiber composite part includes a matrix material; and
   the energy director is made of a different material from the matrix material.

6. The method according to claim 1, wherein the fiber material includes fibers having a maximum length of 10 mm.

7. The method according to claim 1, wherein the matrix material is selected from a group consisting of polyaryletherketone (PAEK), polyetheretherketone (PEEK), polyetherketoneketone (PEKK), polyphenylene sulfide (PPS), and polyamide (PA).

8. The method according to claim 1, wherein the energy director is made of a polyetherimide (PEI) material.

9. The method according to claim 1, wherein step c) includes pressing of the sonotrode onto the first fiber composite part and/or the second fiber composite part.

10. The method according to claim 1, wherein the joint portion extends in a longitudinal direction and step c) includes moving the sonotrode along the longitudinal direction such that a weld seam is formed as the joint.

11. The method according to claim 9, wherein the sonotrode is pressed onto the first fiber composite part and/or the second fiber composite part in a sliding manner for a duration the sonotrode is energized to form the weld seam.

12. The method according to claim 1, wherein step a) includes arranging the first fiber composite part and the second fiber composite part such that they form a partial overlap as the joint portion.

13. The method according to claim 1, wherein step c) includes energizing the sonotrode until the first fiber composite part, the second fiber composite part and the energy director melt at least partially such that subsequent to de-energizing or moving the sonotrode a joint is formed between the first fiber composite part and the second fiber composite part.

* * * * *